(12) United States Patent
Borugian (10) Patent No.: US 6,680,672 B2
(45) Date of Patent: Jan. 20, 2004

(54) VEHICLE DIAGNOSTIC SYSTEM

(75) Inventor: Dennis A. Borugian, High Point, NC (US)

(73) Assignee: Volvo Trucks North America, Inc., Greensboro, NC (US)

( * ) Notice: Subject to any disclaimer, the term of this patent is extended or adjusted under 35 U.S.C. 154(b) by 26 days.

(21) Appl. No.: 09/779,246

(22) Filed: Feb. 8, 2001

(65) Prior Publication Data

US 2002/0104717 A1 Aug. 8, 2002

(51) Int. Cl.$^7$ .............................................. G08B 17/00
(52) U.S. Cl. ........................ 340/584; 340/449; 73/117.3
(58) Field of Search ................................ 340/584, 449; 73/117.3, 116; 701/36

(56) References Cited

U.S. PATENT DOCUMENTS

| | | |
|---|---|---|
| 4,964,679 A | 10/1990 | Rath |
| 5,201,834 A | 4/1993 | Grazioli et al. |
| 5,315,520 A | 5/1994 | Drake et al. |
| 5,403,072 A | 4/1995 | Kilian et al. |
| 5,410,293 A | 4/1995 | Angerfors |
| 5,433,296 A | 7/1995 | Webberley |
| 5,450,930 A | 9/1995 | Martens et al. |
| 5,500,456 A * | 3/1996 | Hughett et al. ............. 523/166 |
| 5,559,286 A | 9/1996 | White et al. |
| 5,648,898 A | 7/1997 | Moore-McKee et al. |
| 5,689,231 A | 11/1997 | Olson |
| 5,808,909 A | 9/1998 | Rees |
| 5,809,437 A | 9/1998 | Breed |
| 5,825,287 A | 10/1998 | Zarybnicky, Sr. et al. |
| 5,827,957 A | 10/1998 | Wehinger |
| 5,835,009 A | 11/1998 | Hanisko |
| 5,845,975 A | 12/1998 | Wells |
| 5,848,672 A | 12/1998 | Brearley et al. |
| 5,890,080 A | 3/1999 | Coverdill et al. |
| 5,892,437 A | 4/1999 | Scheibe et al. |
| 5,934,415 A | 8/1999 | Preston et al. |
| 5,936,153 A | 8/1999 | Steckler et al. |
| 5,936,155 A | 8/1999 | Francois et al. |
| 5,939,978 A | 8/1999 | Kyrtsos |
| 5,962,777 A | 10/1999 | Salamat et al. |
| 5,967,266 A | 10/1999 | Carnegie |
| 5,995,889 A * | 11/1999 | Eisenhour .................... 701/36 |
| 5,999,093 A | 12/1999 | Hanisko |
| 5,999,867 A | 12/1999 | Rogers et al. |
| 6,003,640 A | 12/1999 | Ralea |
| 6,006,868 A | 12/1999 | Klink |
| 6,009,355 A | 12/1999 | Obradovich et al. |
| 6,026,679 A * | 2/2000 | Holmes et al. ............ 73/117.3 |
| 6,047,793 A | 4/2000 | Hasegawa et al. |
| 6,058,343 A | 5/2000 | Orbach et al. |
| 6,072,389 A | 6/2000 | Strasburger |

* cited by examiner

*Primary Examiner*—John Tweel
(74) *Attorney, Agent, or Firm*—Watts Hoffmann Co.

(57) ABSTRACT

A monitoring and information system for a vehicle's brakes and tires. The system includes one or more position sensors and/or temperature sensors that are used to measure parameters of the vehicles brakes and tires. The measured parameters are compared to known threshold parameters with one or more comparators. When one of the measured parameters is outside the limits of one of the threshold parameters, the system provides a signal indicating that an undesirable condition exists on one of the vehicles brakes or tires and provides information about the undesirable condition.

12 Claims, 7 Drawing Sheets

VEHICLE DIAGNOSTIC SYSTEM

TECHNICAL FIELD

The present invention relates to vehicle diagnostic systems and, more particularly, the present invention relates to a vehicle diagnostic system which monitors one or more conditions of the vehicle's brakes and tires and provides an indication of one or more conditions to the operator of the vehicle.

BACKGROUND OF THE INVENTION

Operators of vehicles need to know the condition of the vehicle's brakes and tires to ensure safe operation of a vehicle. To ensure safe operation of the vehicle, the vehicle's brakes should not drag, the brakes should not fade, the temperature of the brakes should not be high enough to cause mechanical brake fade, the temperature of the tires should not be high enough to cause tire ply separation, the brakes should be properly adjusted, and the brake pads should have a sufficient amount of brake lining remaining.

Brake drag occurs when there is no gap between the brake pad and the brake drum when the brakes are released. When brakes are dragging, the brake pads are in continuous contact with the brake drum. Heat is generated by the frictional engagement between the brake pads and the brake drums as the vehicle wheels turn. The heat created by dragging brakes prematurely wears out the brake linings and the wheel bearings. In addition, if the heat is excessive enough for a prolonged period of time, the brake drums will expand or even crack and the tires may fail.

There are many types and causes of braking fade. Fade may result, for example, from a reduction in friction between linings and drums caused by exposure to water. Most typically, fade, resulting in a reduction of braking force, occurs when brakes drag on a long grade. If brakes are not properly adjusted, the drum will overheat and expand to an extent that pushrod travel is insufficient to fully actuate the brakes. This is one example of mechanical brake fade. Mechanical brake fade may also result from various mechanical defects in the brake system, such as scored brake drums. In contrast, heat fade occurs when the brake linings overheat and apply less frictional force when the linings are applied. It is desirable to provide a gradual and predictable warning of fade.

When the brake drums are excessively hot for a prolonged period of time, due to brake drag or prolonged application of the brakes, the brake drums will expand. Brake drums can reach temperatures of up to 800 to 1,000 degrees Fahrenheit with prolonged braking. Brake fade begins at approximately 300 degrees Fahrenheit and becomes significant at 500 degrees Fahrenheit. Brake drums increase in diameter by about 0.01" per 100 degrees Fahrenheit. At 600 degrees Fahrenheit the brake drum diameter will have expanded by 0.055" from the diameter at an average operating temperature of about 50 degrees Fahrenheit, causing the required air chamber push rod stroke to increase by approximately 0.40", before the brake pads engage the brake drums. As the temperature of the system rises to a critical point, generally 300° F., the brake lining itself becomes adversely affected and its frictional coefficient decreases, further reducing the braking system's effective retardation force. This is known as brake lining fade. The problem is even more significant when lightweight centrifuge brake drums are used since they expand more readily than heavy cast drums. When the spring brakes of a parked vehicle with hot, expanded drums are applied, automatic slack adjusters may over-adjust and cause the brakes to drag.

Tires are heated up by being driven over hot pavement. Tires heat up faster when the load is excessive or the tire pressure is below recommended values. In addition, dragging brakes and prolonged braking produce significant heat that increases the temperature of the tires. As the tires heat up, the internal pressure of the tires increases and the tire rubber softens. The internal pressure of the tire increases by approximately 1 psi for each increase in temperature of 10 degrees Fahrenheit. Depending on the tire, tire ply to bead separation is possible at approximately 266 degrees Fahrenheit.

The brake pads of brakes that are under adjusted do not engage the brake pads to the brake drums with as much force as properly adjusted brakes. As a result, brakes that are under adjusted may not supply a sufficient amount of stopping power. Brakes that are over adjusted may drag causing unnecessary wear and could cause the brakes to overheat, resulting in brake lining fade. Again, the excessive heat could cause the brake drums to expand, resulting in mechanical fade or cracking of the drum. Brakes having linings that are worn beyond an acceptable level may not supply a sufficient amount of stopping power for safe operation of the vehicle.

It is known in the art to measure the angular rotation of an S-cam that brings the brake shoes and brake pads into frictional engagement with the brake drum to determine the adjustment of the brakes and wear of the brakes. However, to employ this method calculations must be performed to convert the angular rotation of the S-cam to an estimated travel distance at the brake shoe center. This calculation differs depending on the brake size and type, as well as the effective radius of the S-cam. S-cam type sensors that measure angular rotation must be configured to calculate the brake shoe travel of the particular brake type and size that it is monitoring.

An indication of imbalance between brakes on opposite sides of the vehicles is a difference in temperature of the brakes. Brake imbalance between brakes on opposite sides of the vehicle results in uneven braking force and possible vehicle instability due to brake steer. This condition may also cause uneven brake wear from side to side of the vehicle. An indication of brake imbalance between tandem axles is elevated temperatures of the brakes of one axle compared to the temperatures of the brakes of another axle. Another indication of brake imbalance between axles is a difference in brake lining thickness between the brakes of two different axles when the brakes of each axle were relined at the same time. Brake imbalance between axles results in uneven wear and reduced overall retardation force for the vehicle due to premature brake fade occurring on an overworked axle. The axle doing less work, due to poor adjustment, also applies less retardation force than is intended. Vehicle stability and controllability can be adversely affected if the brakes on one axle lock up prematurely. When drive axle brakes lock up, the tractor-trailer may jackknife. When trailer brakes lock up, the trailer may swing out of its traffic lane. When the steer axle locks up, a temporary loss of steering ability may occur.

What is needed is a vehicle diagnostic system which provides an indication to the operator of the vehicle in the vehicle cab, or to a technician from a data file, of one or more conditions of the brakes and tires of the vehicle.

Disclosure of Invention

A first exemplary embodiment of the present invention concerns a method and apparatus for indicating a condition of a vehicle brake assembly. The brake assembly has a brake shoe having an outer surface. A brake lining pad is connected to the outer surface of the brake shoe. A brake drum has an inner surface that surrounds the brake shoe and brake lining pad. The brake shoe and brake pad are movable from a disengaged position, where the brake pad is spaced apart from the brake drum, to an engaged position, where the brake pad is in forcible engagement with the brake drum. The apparatus includes a position sensor, a comparitor and an indicator. The sensor measures a gap between the brake lining pad and the inner surface of the brake drum in the disengaged position. The comparitor compares the measured gap to known values. The indicator is in communication with the comparitor. The indicator indicates brake conditions that are determined by comparing the measured gap to the known values in a way that is perceivable to a vehicle operator. The indicator alerts a vehicle operator to one or more brake and tire conditions.

In the first exemplary embodiment, the position sensor may measure the distance from the brake lining pad to the inner surface of the brake drum by measuring the relative linear motion of the brake shoe with respect to the position sensor when the brake shoe is moved between the disengaged and engaged positions.

In one application of the first exemplary embodiment, the indicator indicates brake drag when the measured gap is zero or less than the allowable brake drum run out.

In a second application of the first exemplary embodiment, the position sensor measures a distance between the brake shoe and the position sensor and the indicator provides an indication of the brake lining thickness remaining. In the second application of the first exemplary embodiment, the indicator may indicate the distance capable of being traveled safely before brake relining is required or the indicator may indicate that brake relining is required.

In a third application of the first exemplary embodiment, the indicator indicates that the brake assembly is out of adjustment.

In a fourth application of the first exemplary embodiment, the indicator indicates brake imbalance between first and second vehicle brake assemblies.

A second exemplary embodiment of the present invention concerns a method and apparatus for indicating a condition of a vehicle wheel assembly. The apparatus of this embodiment includes a sensor, first and second comparitors, a timer, and an indicator. The sensor is coupled to the wheel assembly for measuring a temperature of a wheel assembly component. The first comparitor compares the measured temperature of the component to a known threshold temperature. The timer measures a time period that the measured temperature exceeds the threshold temperature. The second comparitor compares the measured time period to a known soak time. The indicator is in communication with the first and second comparitors. The indicator indicates wheel assembly conditions that are determined by comparing the measured temperature and time periods to the threshold temperature and soak time.

In a first application of the second exemplary embodiment, the apparatus indicates brake fade. In this application, the sensor measures the temperature of a brake component. The indicator provides an indication that brake fade is possible when the measured temperature exceeds 300 degrees Fahrenheit for longer than the soak time. The indicator may indicate brake fade when the measured brake temperature exceeds 500 degrees Fahrenheit for longer than the soak time.

In a second application of the second exemplary embodiment, the indicator indicates whether tire ply separation is possible. In this application of the second embodiment, the sensor may measure the temperature of a tire directly. Alternatively, the tire temperature may be estimated by extrapolating the measured brake temperature.

In a third application of the second exemplary embodiment, the indicator indicates brake imbalance between first and second vehicle brake assemblies, when differences in temperature between the brake assemblies indicate brake imbalance. The temperature sensor may be a thermocouple embedded in the tire to read its temperature directly, a thermocouple mounted to the brake assembly, a frame mounted infrared sensor to read the temperature of the tire sidewall, or an infrared sensor mounted on the rim to measure air temperature inside the tire.

The position sensor may utilize radar for sensing the position of the brake shoe. Alternatively, the position sensor may be a linear variable differential transformer or potentiometric displacement transducer which is physically connected to the brake shoe. In one embodiment, a brake spider is operably connected to the brake shoe to facilitate movement of the shoe and pad between a disengaged position where the pad is spaced apart from the brake drum and an engaged position where the pad is in forceable engagement with the brake drum. A dust shield is connected to the brake spider. The dust shield has a first side that is oriented toward the brake shoe and a second side that is oriented away from the brake shoe. The dust shield includes an opening for a linkage in one embodiment.

Additional features of the invention will become apparent and a fuller understanding obtained by reading the following detailed description in connection with the accompanying drawings.

BEST MODE FOR CARRYING OUT THE INVENTION

The present invention is directed to vehicle diagnostic system 10 which monitors conditions of a vehicle's brakes 12 and tires 14 and provides an indication of the condition of the brakes and tires to the operator of the vehicle. Referring to FIGS. 1–4 the vehicle diagnostic system 10 is included on otherwise typical drum brakes 12 in the exemplary embodiment. By monitoring the position (P) of the brake shoes, the temperature ($T_B$) of the brakes, and the temperature ($T_T$) of the tires, the diagnostic system 10 of the present invention is able to determine whether the vehicles brakes 12 are dragging, whether the temperature of the brakes is high enough to be at risk of causing brake fade, whether the temperature of the tires is high enough to be at risk of causing tire ply separation, whether the brakes are properly adjusted, the amount of brake lining remaining, and whether brakes on each side of the vehicle and the brakes of each axle are balanced.

In the exemplary embodiment, the diagnostic system 10 is used with drum brakes. However, it should be apparent to those skilled in the art that many of the features of the present invention may be utilized to determine the condition of brakes and tires of vehicles having other types of brakes, such as disk brakes.

Figure 1:
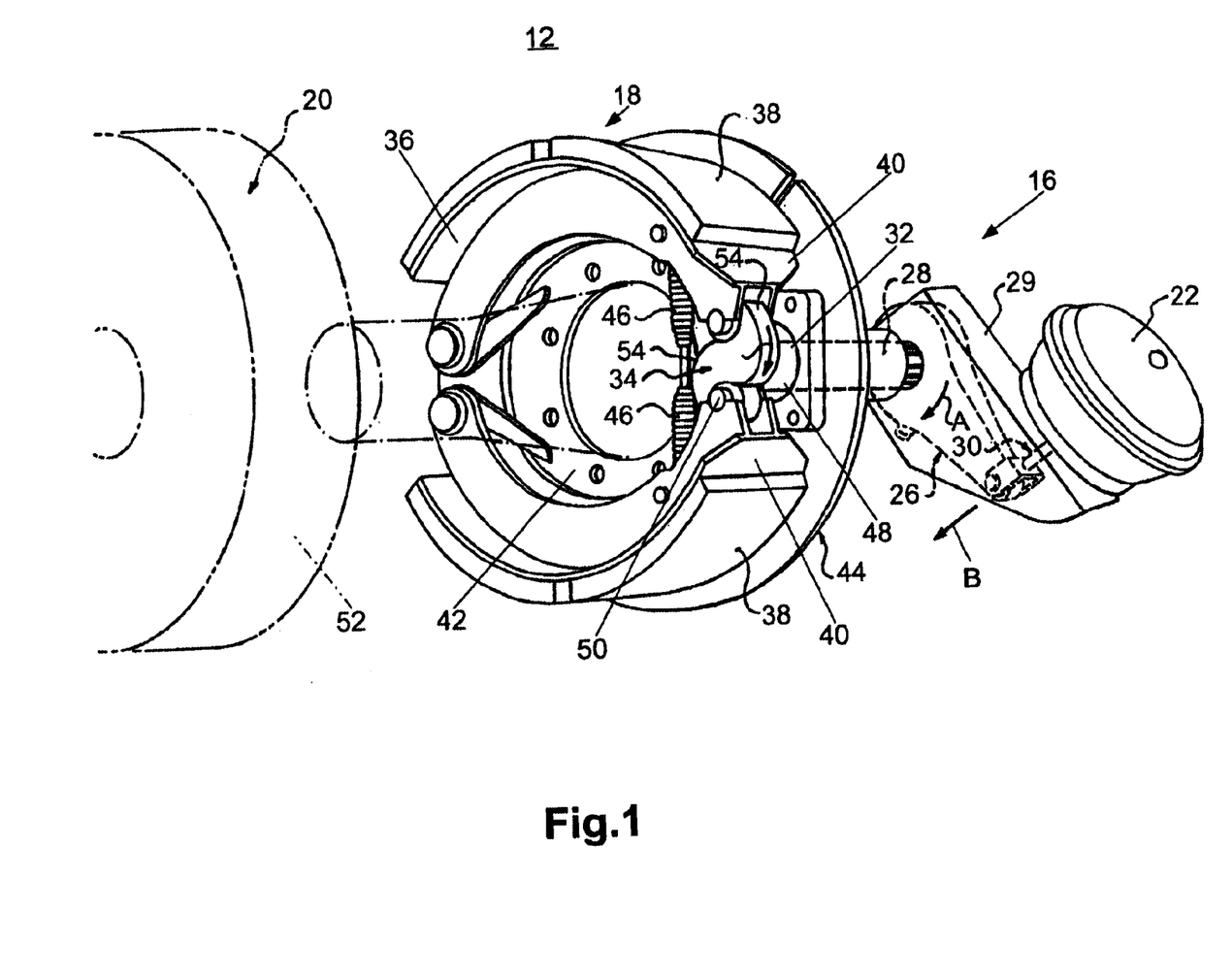
FIG. 1 is an exploded perspective view of a drum braking system.

Referring to FIG. 1, a typical brake drum system of a vehicle includes an actuator 16, a brake shoe assembly 18, and a brake drum 20. The actuator 16 includes a brake chamber 22, a slack adjuster 26, and a cam shaft 28. The brake chamber 22 is mounted to a mounting bracket 29 that is connected to the brake spider. The brake spider is mounted to the axle. The brake chamber 22 contains a diaphragm (not shown) and a push rod 30. The brake chamber converts air pressure behind the diaphragm to linear driving force when the brakes are applied.

As illustrated in FIG. 1, the push rod 30 extends from the brake chamber 22 and is pivotally connected to the slack adjuster 26. The slack adjuster 26 is rotated in direction A by the push rod 30 as the push rod 30 is forced from the brake chamber 22 in a direction B by the diaphragm. The slack adjuster 26 engages splines 32 of the cam shaft 28 so that rotation of the slack adjuster 26 rotates the cam shaft 28 and an S-cam 34 that is attached to an end of the cam shaft 28.

Referring to FIG. 1, the brake shoe assembly 18 includes brake shoes 36, brake pads 38 attached to an outer surface 40 of each of the brake shoes 36, a brake spider 42 and a dust shield 44. The brake shoes 36 and the brake pads 38 are connected to the brake spider 42 by retainer springs (not shown) and return springs 46 in a manner that is well known in the art. The dust shield 44 is mechanically fastened to the brake spider 42.

Figure 3:
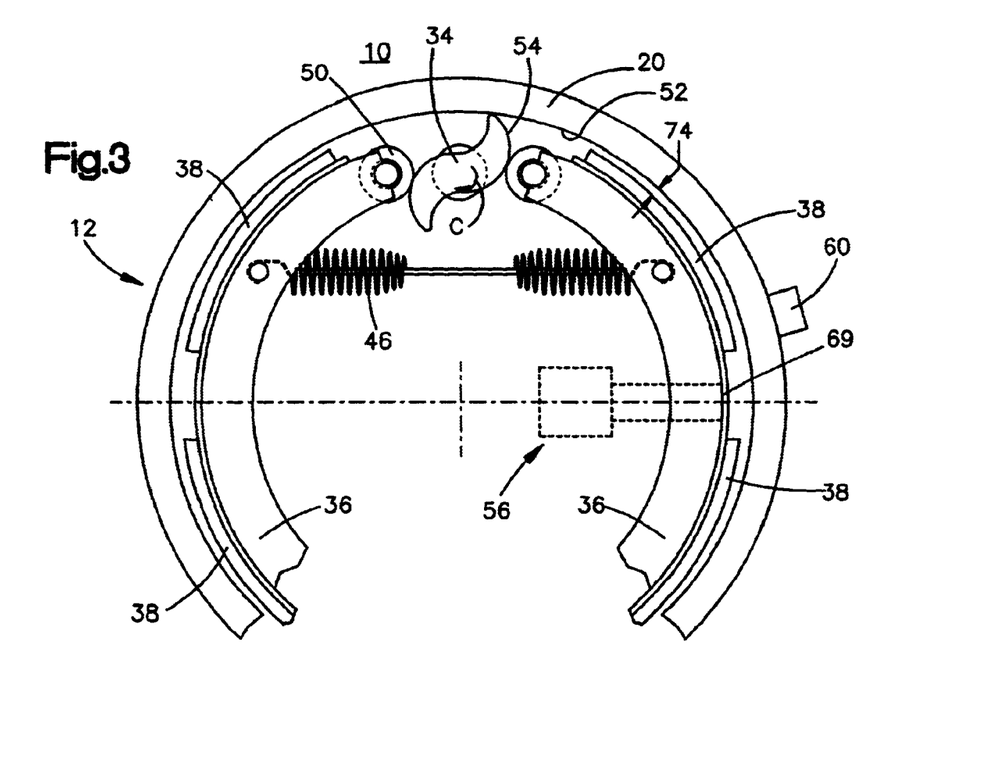
FIG. 3 is a fragmentary front elevational view of a drum braking system in a disengaged position.
Figure 4:
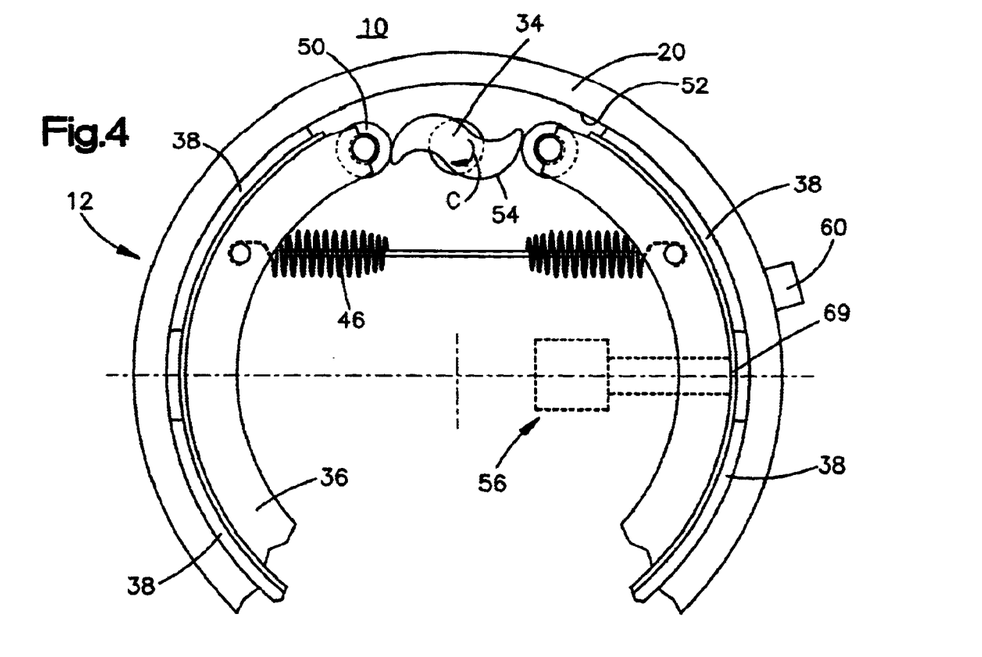
FIG. 4 is a fragmentary front elevational view of a drum braking system in an engaged position.

Referring to FIG. 1, the cam shaft 28 extends through an opening 48 in the brake spider 42 and an opening (not shown) in the dust shield 44. The brake shoe assembly 18 includes cam rollers 50 on the brake shoes. The return springs 46 force the cam rollers 50 against the S-cam 34. Referring to FIGS. 3 and 4, rotating the S-cam 34 acts on the cam rollers 50 to force the brake shoes 36 and pads 38 to spread apart, bringing the pads 38 into frictional engagement with an interior surface 52 of the brake drum 20.

As illustrated in FIGS. 1, 3 and 4, the S-cam 34 has S-shaped cam surfaces 54. The cam rollers 50 on the brake shoes 36 are urged against the cam rollers 50 by the return biasing springs 46. Rotating the S-cam 34 in direction C forces the cam rollers 50 to follow divergent paths on the S-shaped cam surfaces 54 thereby forcing the brake shoes 36 and pads 38 apart. Rotating the cam shaft 28, either by applying the brakes, causing the push rod 30 to rotate the slack adjustor 26, or by adjusting the slack adjuster 26, moves the brake pads 38 closer to the brake drum 20.

Figure 6:
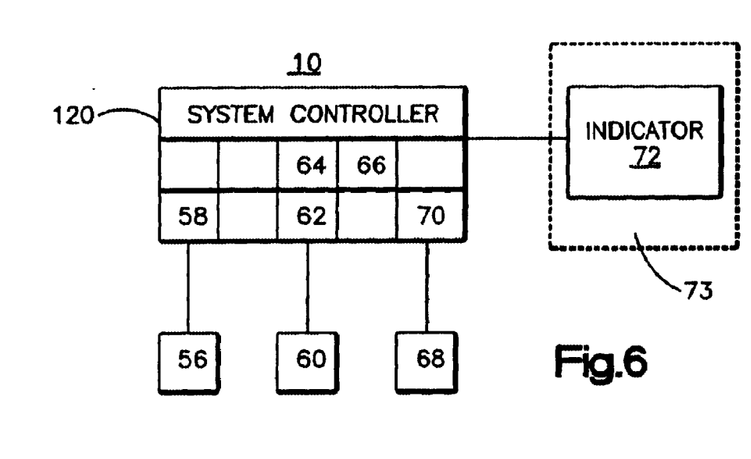
FIG. 6 is a schematic representation of the sensors, comparitors and indicator of the present invention.

Referring to FIG. 6, the diagnostic system 10 of the exemplary embodiment includes a position sensor 56, a position comparator 58, a brake temperature sensor 60, a brake temperature comparator 62, a timer 64, a time comparitor 66, a tire temperature sensor 68, a tire temperature comparator 70, and an indicator 72 in a vehicle cab 73. Referring to FIG. 3, the position sensor 56 measures a gap 74 between the brake pad 38 and the inner surface 52 of the brake drum 20. The position sensor 56 also measures the absolute position of the brake shoe 36 with respect to the position sensor 56. The position comparator 58 compares the gap 74 measured by the position sensor 56 to a given value to determine whether the brakes 12 are out of adjustment or are dragging. The position comparator 58 compares the applied position of the brake shoes 36 to known initial pad thickness and initial brake shoe position values to determine an amount of brake pad remaining. The brake temperature sensor 60 measures a temperature ($T_B$) of a brake component. The brake temperature comparator 62 compares the measured brake component temperature ($T_B$) to known temperatures at which brake fade is possible and at which brake fade is significant. The tire temperature sensor 68 measures a temperature ($T_T$) of a tire. The tire temperature comparator 62 compares the measured tire temperature ($T_T$) to known temperatures at which tire ply separation is possible. The timer 64 measures time periods that the brake component temperature ($T_B$) and the tire temperature ($T_T$) exceed the temperatures at which brake fade is possible, brake fade is significant, and at which tire ply separation is possible. The time comparator 66 compares the times measured by the timer 64 to known soak times to determine whether a brake fade or tire ply separation problem exists. The indicator is in communication with the position comparator 58, the brake temperature comparator 62, the tire temperature comparator 70, and the time comparator 66. When the comparators sense the appropriate condition, the indicator 72 indicates to the operator of the vehicle in the vehicle cab 73 that the brakes are dragging, brake fade exists, tire ply separation is possible, the brakes are out of adjustment, the brake linings need to be changed or brake imbalance exists.

Figure 2A:
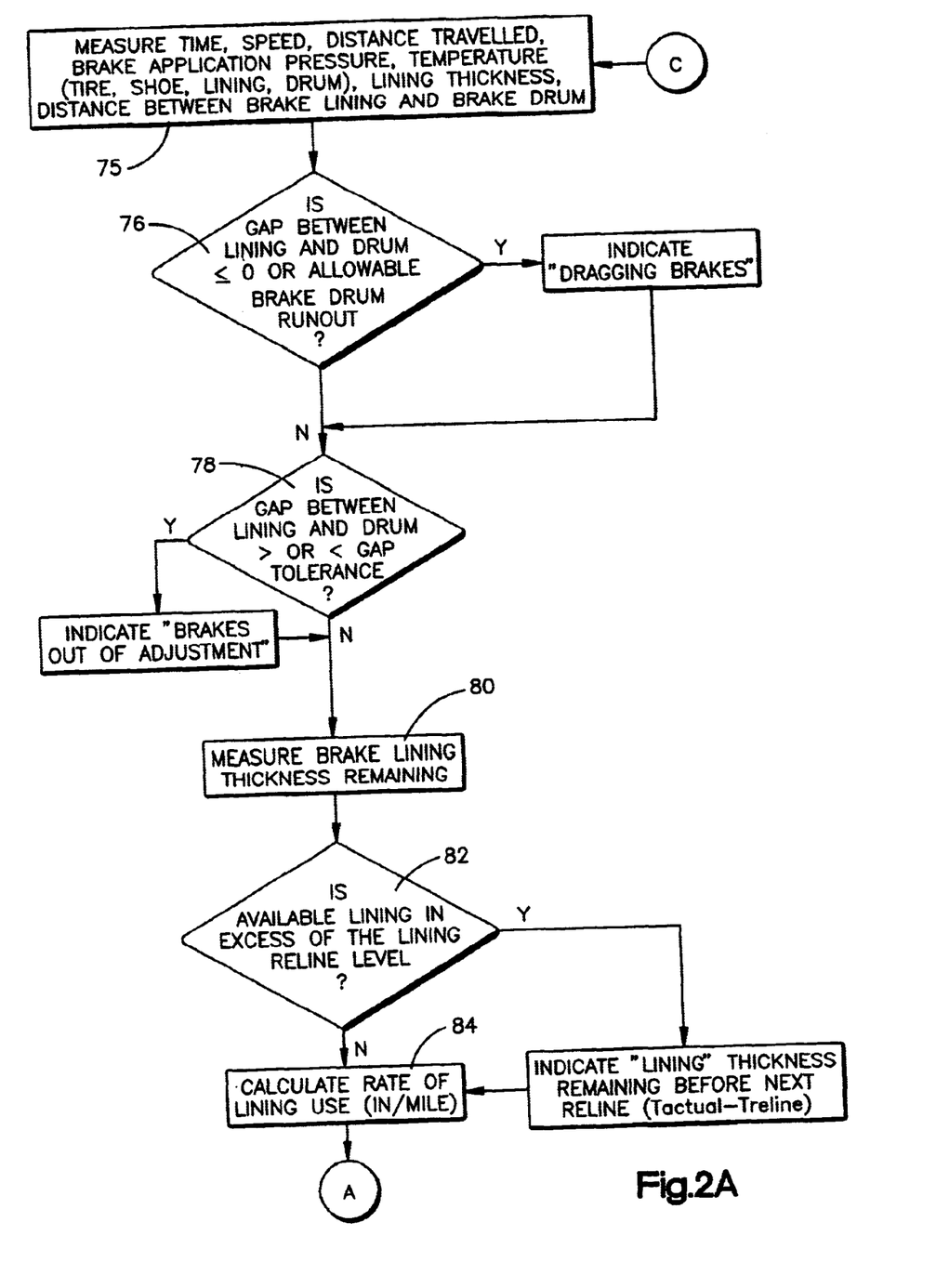
FIG. 2A is a first portion of a block diagram illustrating the steps of a method for monitoring brake and tire conditions.
Figure 2B:
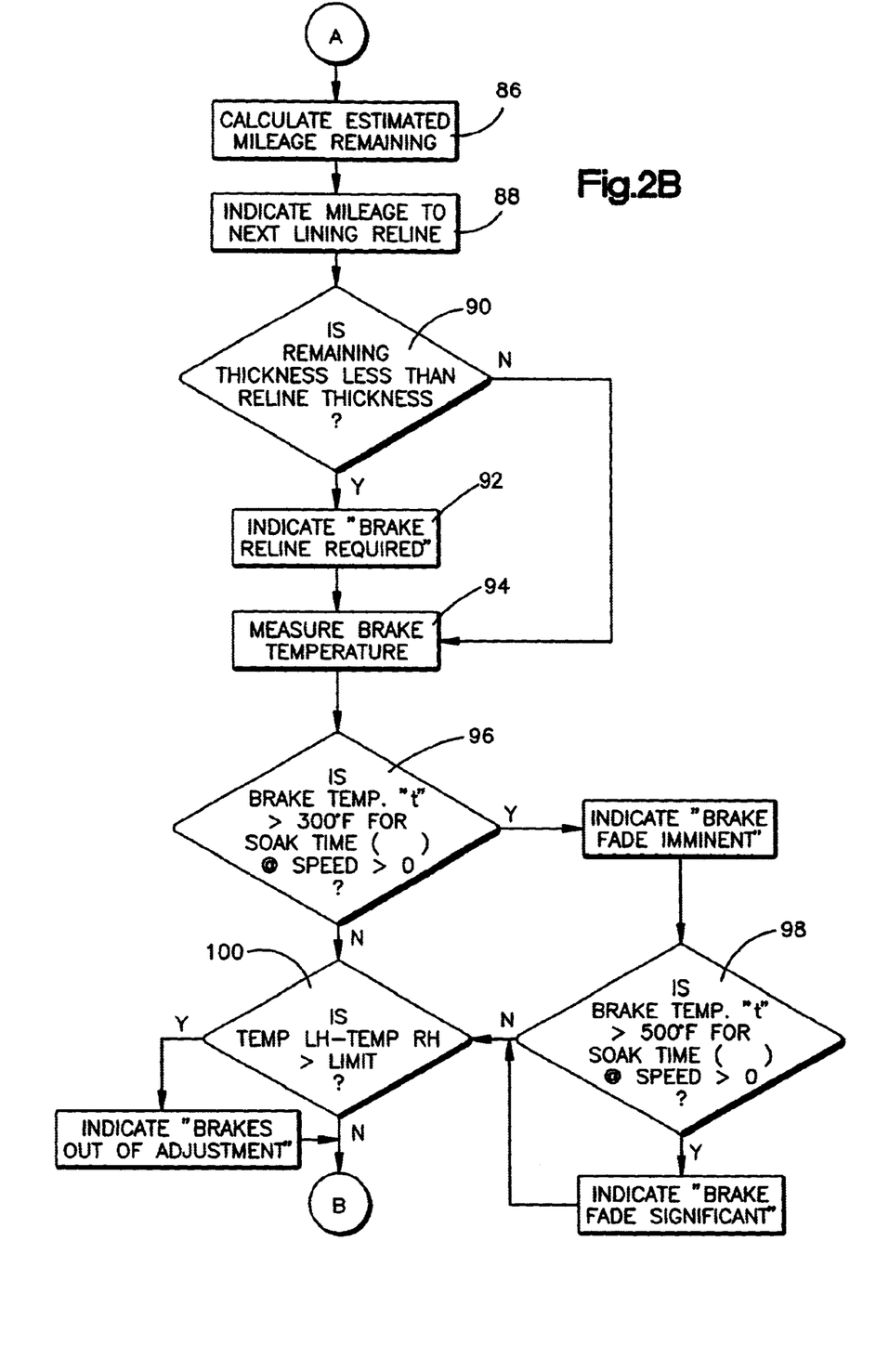
FIG. 2B is a second portion of a block diagram illustrating the steps of a method for monitoring brake and tire conditions.
Figure 2C:
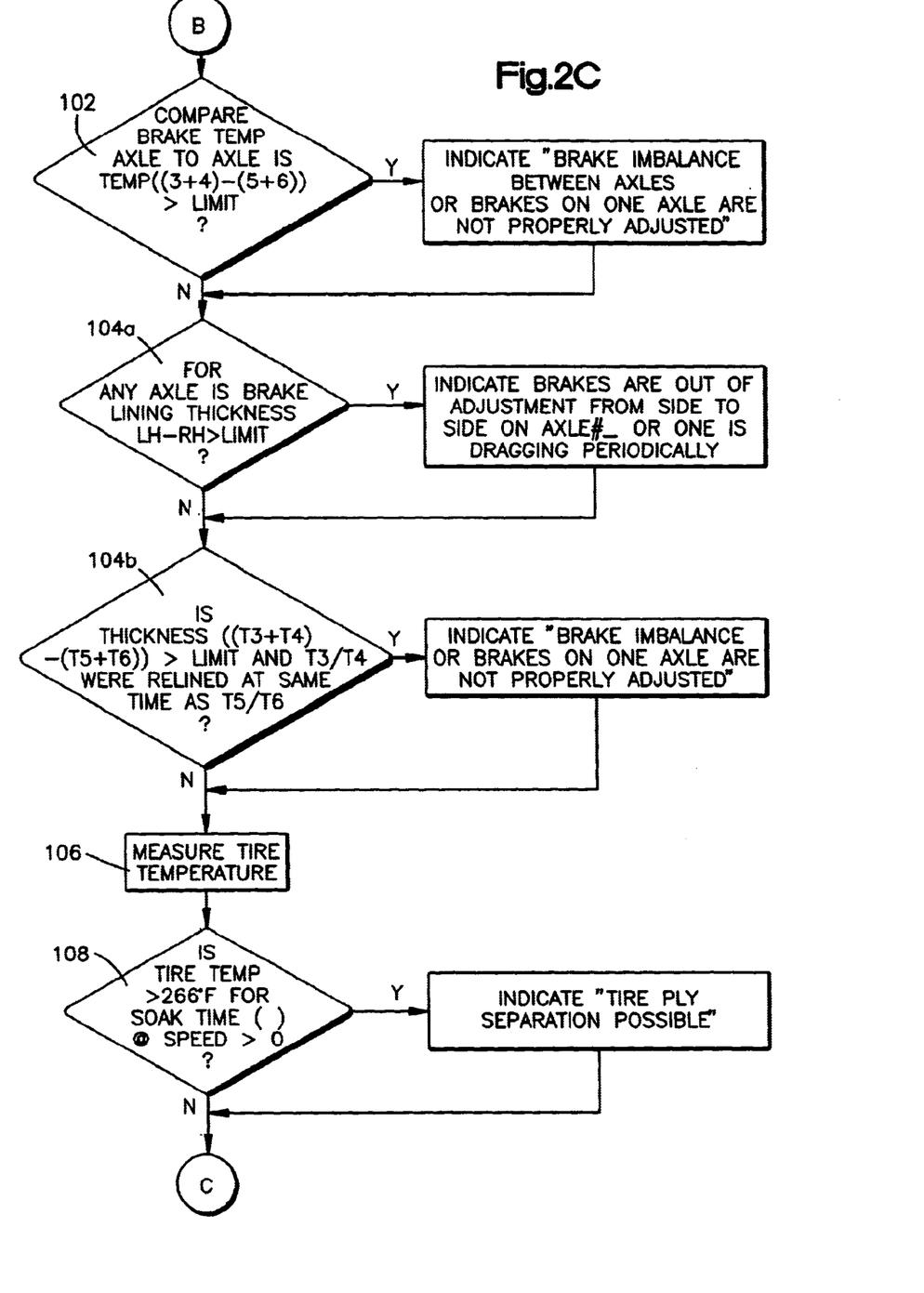
FIG. 2C is a third portion of a block diagram illustrating the steps of a method for monitoring brake and tire conditions.

FIGS. 2A–2C show the steps performed by the vehicle diagnostic system 10. The vehicle diagnostic system 10 measures the distance between the brake lining 36 and the brake drum 20 in the first step 75. Referring to FIGS. 3 and 4, the distance between the brake pad 38 and brake drum 20 is measured by monitoring the position of the brake shoe 36 when the brakes are released and the position of the brake shoe 36 when the brakes are applied. In the exemplary embodiment, the proximity sensor 56 is coupled to the brake shoe 36. The proximity sensor 56 measures the distance the brake shoe 36 travels as it moves between the applied position (FIG. 4) and released position (FIG. 3). The distance the brake pad 38 moves when the brakes 12 are applied is the distance between the brake lining pad and brake drum 20. U.S. patent application filed on the filing date of the present application, U.S. Ser. No. 09/779,863, entitled "Brake Shoe Proximity Sensor" discloses the use of a position sensor to monitor the movement of the brake shoe with respect to the position sensor to determine a distance between a brake pad and the brake drum 20. The application entitled "Brake Shoe Proximity Sensor" is owned by the owner of the present application and is incorporated herein by reference. Examples of position sensors that can be used to monitor the position of the brake shoe are model nos. LCP 12-12 and LCP 12-25, which are linear potentiometers available from Precision Sales, located in Newton Square, Pa. Model no. LCP 12-12 can handle a ½" stroke. Model no. LCP 12-25 can handle a 1" stroke.

In an alternate embodiment, a rotary potentiometer (not shown) may be used to determine the distance between the brake pad 38 and the brake drum 20. In this embodiment, the rotary potentiometer is coupled to the cam shaft 28 that rotates the S-cam 34. By monitoring the amount of rotation of the S-cam 34 when the brakes are applied and released, the distance between the brake pad 38 and the brake drum 20 can be calculated. U.S. Pat. No. 5,339,069, filed on Aug. 16, 1994 discloses monitoring rotation of the S-cam 34 to determine adjustment of the brakes 12. The '069 patent is incorporated herein by reference. One suitable rotary potentiometer is model no. SP-22 E, produced by Precision Sales. This rotary potentiometer is ⅞" in diameter with a ¼" long shaft.

Figure 5:
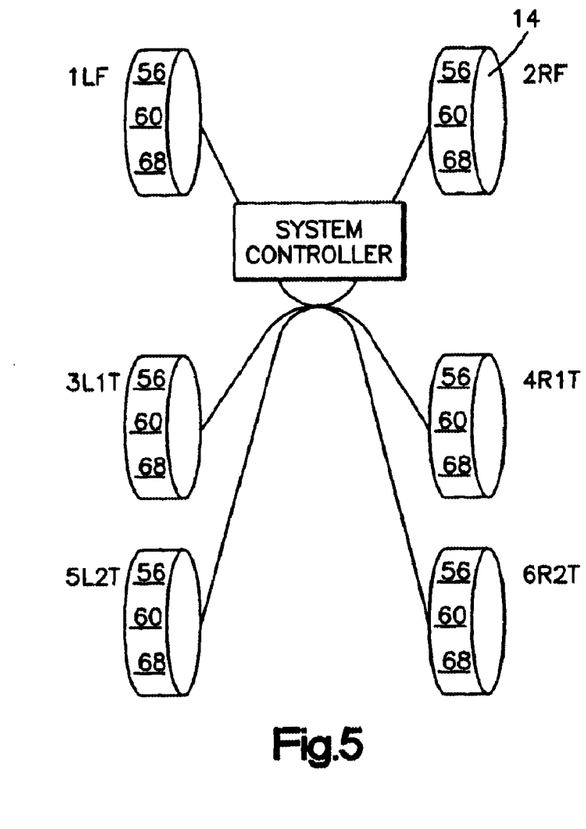
FIG. 5 is a schematic representation of a system controller in communication with sensors on each wheel of a vehicle.

Referring to FIG. 5, a position sensor is mounted to each brake 12 of the vehicle in the exemplary embodiment. When the position of the brake shoe 36 is monitored, the position sensor 56 is mounted to the dust shield 44. When a rotary potentiometer 74 is used it is mounted to the cam shaft 28.

Referring to FIG. 2A, the second step 76 is to determine whether or not the brakes are dragging. When the brake pressure is released, the spring brakes (if applicable) are not applied and the position comparitor 58 indicates that the distance between the brake pad 38 and the brake drum 20 is approximately equal to zero, the indicator 72 provides a signal to the operator of the vehicle indicating that the brakes are dragging. In the exemplary embodiment, the gap is measured when the brakes are in the released position, when the air pressure is zero or below the application pressure threshold needed to overcome the return spring force and when the spring brakes are not applied. The threshold pressure typically 10–15 psi is primarily a function of frictional forces within the brake assembly and the return spring force which varies by brake size and type.

The third step 78 performed by the diagnostic system 10 determines whether the brakes 12 are properly adjusted. Referring to FIGS. 3 and 4, the brake pads 38 and brake drum 20 wear due to repeated application of the brakes. The brake shoes 36 must move farther to force the brake pads 38 against the brake drum 20 as the brake pads 38 and brake drum 20 wear. The slack adjuster 26 (FIG. 1) must be adjusted to compensate for brake pad wear and for wear of the interior surface of the brake drum 20. Referring to FIG. 1, the length of the push rod that extends from the brake chamber 22 increases as the push rod is forced out of the brake chamber by the diaphragm (not shown).

Travel of the push rod 30 results in only a small rotation of the slack adjuster 26 and the cam shaft 28. If, before the brakes are applied, the brake pads 38 are not in close proximity to the interior surface 52 of the brake drum 20 the maximum push rod travel will be insufficient to bring the brake pads 38 into frictional engagement with the brake drum 20. This situation is known in the art as "brakes out of adjustment." The brakes may be adjusted by adjusting the slack adjuster in a manner well known in the art when the brakes are not applied. Some slack adjusters adjust automatically. Adjusting the slack adjuster will, if the brake pads 38 and brake drums 20 are not overly worn, bring the brakes back into adjustment by moving the brake pads 38 back into close proximity with the brake drum 20 when the push rod is in a retracted position.

The braking force of the brakes is greatly reduced when the brakes are out of adjustment. It is the responsibility of the operator of the vehicle to ensure that the brakes are adjusted correctly. In most prior art systems, this meant that the operator has to stop at every brake check point, crawl under the vehicle to inspect the brakes and, if necessary, adjust the brakes.

Referring to FIGS. 3 and 4, an accurate indication of the brake adjustment is obtained by monitoring the gap 74 between the brake pad 38 and the brake drum 20. The position of the brake shoes 36 is measured for each application of the brakes by the proximity sensor 56. The distance the brake shoes 36 travels is equal to the gap 74 between the brake pad 38 and the brake drum 20. The maximum travel of the brake shoes 36 produced by the actuator 16 is known for any given brake assembly. The position comparitor 58 compares the gap measured by the position sensor 56 and, if the gap is greater than the maximum allowed travel of the brake shoes 36, the indicator indicates that the brakes are out of adjustment to the operator of the vehicle. If the position comparitor 58 determines that the gap measured by the position sensor 56 is less than the desired minimum gap, the indicator 72 also indicates to the operator of the vehicle that the brakes are out of adjustment. In the exemplary embodiment, a warning is given to the operator when a brake shoe or corresponding push rod travel approaches the maximum brake shoe and push rod travel specified by the manufacturer, alerting the operator that the brakes must be adjusted soon.

Referring again to FIG. 2A, the fourth step 80 performed by the diagnostic system 10, is to measure the remaining lining thickness of the brake pad 38. Referring to FIGS. 3 and 4, the remaining lining thickness can be monitored by measuring the absolute distance from the brake shoe 36 to the position sensor 56, in the exemplary embodiment. In the alternative, a rotary potentiometer may be used to measure wear by monitoring the rotation of the S-cam.

The initial position of the brake shoe 36 with respect to the position sensor 56 is recorded when the brake pads are new. As the brake pads 38 wear, the distance between a properly adjusted brake shoe 36 and the proximity sensor 56 increases, giving an indication of the brake wear. The usable thickness (T) of the brake pads 38 is known when new brake pads are installed. The wear of the inner surface 52 of the brake drum 20 is generally negligible in comparison with the wear of the brake pads 38. Ignoring the wear of the brake drum 20, wear (W) of the brake pad 38 is calculated by the equation:

$$W = P - P^*,$$

Wear W is the thickness of the brake lining worn away, P is the position of the brake shoe monitoring by the proximity sensor 56 and P* is the initial position of the brake shoe when the brake pads were installed. The monitored position P and the initial position P* may be the applied or release position of the brake shoes 36. In the exemplary embodiment, the initial applied position $P_{IA}$ of the brake shoe 36 is compared with the position of the brake shoe 36 when the brakes are applied to determine brake pad wear. This is done since the brake state of adjustment does not affect the calculation when the brakes are applied. The remaining usable lining thickness ($T_r$) of the brake pads 38 is equal to the brake wear (W) subtracted from the initial usable thickness ($T_I$) of the brake pads. In the exemplary embodiment, the indicator 72 provides an alarm to the operator of the vehicle in the vehicle when the position comparitor 58 indicates that the brake pads 38 are nearly worn out.

Referring to FIG. 2A, the fifth step 82 performed by the diagnostic system 10 is to provide an indication of the available lining remaining before the next reline is required. The indicator 72 provides an indication to the operator of the vehicle in the vehicle cab of the actual lining thickness that remains before relining is required. That is, the indicator indicates the difference between the actual thickness of the brake pads 38 and the thickness of the brake pads when relining is recommended.

The sixth step 84 performed by the diagnostic system 10 is calculating the rate of lining use in inches of lining used per mile. Since the wear (W) is continually calculated by the diagnostic system 10, the diagnostic system 10 can provide an indication of how fast the lining is being worn. The rate of lining use is calculated by dividing the thickness of lining used by the distance traveled by the vehicle when that lining was used.

Referring to FIG. 2B, the seventh step 86 performed by the diagnostic system 10 is calculating the estimated mileage remaining before a reline is required. The estimated mileage remaining before a reline is required is calculated by measuring the remaining usable lining thickness (step four) and dividing it by the rate the lining is used (step six 84).

In the eighth step 88, the indicator 72 provides a continuous indication of the estimated mileage remaining to next reline to the operator of the vehicle in the vehicle.

In the ninth step 90 performed by the vehicle diagnostic system, the position comparator 58 determines whether the remaining lining thickness is less thick than the reline thickness (position comparator 58 determines whether or not there is any usable lining remaining). If the remaining lining thickness is less than the recommended reline thickness, the indicator 72 provides an indication to the operator of the vehicle, in the vehicle that brake relining is required (Step 10, 92). The measurements of the lining thickness, the gap between the lining and the drum or the lining temperature can be selectively displayed for each wheel. The measurements of the worst wheel is automatically displayed for each parameter in the exemplary embodiment.

Figure 7A:
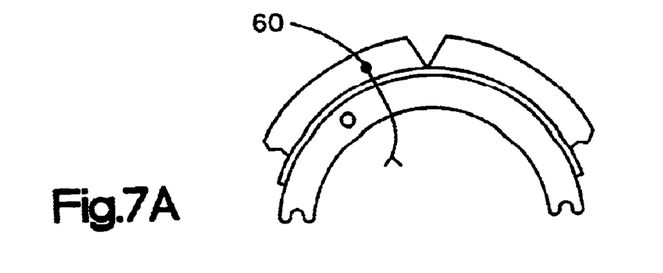
FIG. 7A is a front elevational view of a thermocouple attached to a brake shoe.

Referring to FIG. 2B, the eleventh step 94 performed by the diagnostic system 10, is measuring the temperature of the brake 12 with the brake temperature sensor 60. In the embodiment shown in FIGS. 3 and 4, the temperature sensor is mounted to the brake drum. However, it should be readily apparent to those skilled in the art that the temperature sensor can be mounted to the brake shoe, the brake pad or any other component of the brake. In the exemplary embodiment, a brake temperature sensor 60 is mounted to each brake of the vehicle (FIG. 5). In the illustrated embodiment, the brake temperature sensor 60 is a thermocouple located at the interface of the brake lining pad and the brake shoe, near the center of the pad are as shown in FIG. 7A. For riveted brake linings it is desirable to locate a thermocouple just below the rivet heads.

Figure 7B:
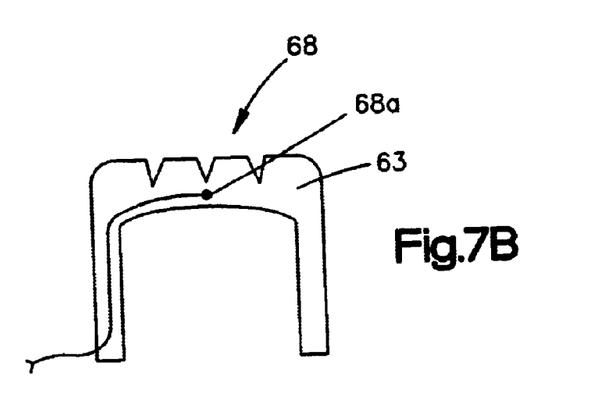
FIG. 7B is a sectional view of a thermocouple in the tread of a tire.
Figure 7C:
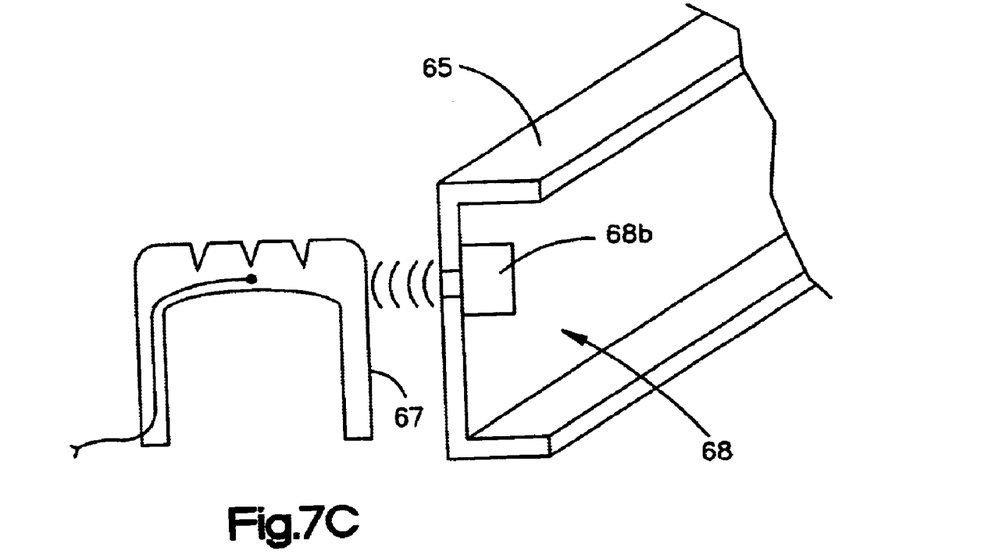
FIG. 7C is a perspective view of an infrared sensor mounted to a vehicle frame.

In one illustrated embodiment, the tire temperature sensor 68 is a thermocouple 68a inside the tire tread 63 as shown in FIG. 7B. In a second embodiment, shown in FIG. 7C, an infrared temperature sensor 68b is mounted to the vehicle frame 65 facing the tire sidewall 67. The infrared temperature sensor 68b optically measures the temperature of the tire sidewall. One infrared temperature sensor 68b that may be used is model 0S101 available from Omega. In an alternate embodiment, the temperature of the tire is extrapolated using heat transfer calculations based upon the temperature of the brake shoe. In the exemplary embodiment, one brake temperature sensor and one tire temperature sensor is included on each wheel of the vehicle.

The twelfth step 96 performed by the diagnostic system 10 is determining whether brake fade is imminent. Expansion of the brake drums due to elevated temperatures over a significant period of time is known as mechanical brake fade. When the brake temperature is greater than 300° for longer than soak time of two minutes while the vehicle is traveling brake lining fade becomes likely. The soak time is a default value based upon current brake lining and drum technology that can be modified by the vehicle builder for specific applications or as technology improves. The brake temperature comparitor 62 compares the brake temperature sensed by the brake temperature sensor 60 and provides a signal to the timer 64 when the brake temperature is over 300°. The timer 64 provides a measure of time to the time comparitor 66 that the brake temperature exceeds 300°. When the time provided to the timer comparitor 66 by the timer 64 is greater than the soak time, the indicator provides an indication to the operator of the vehicle, in the vehicle that brake fade is imminent.

The thirteenth step 98 performed by the diagnostic system 10 is to provide an indication of whether brake fade is significant. Brake lining fade becomes significant when the brake temperature is greater than 500° for longer than soak time of two minutes. The brake temperature sensor 60 provides a measure of the brake temperature to the brake temperature comparitor 62. When the brake temperature is greater than 500°, the brake temperature comparitor 62 provides a signal to the timer 64. The timer 64 measures an amount of time that the brake temperature is greater than 500°. The time comparitor 66 compares the time that the brakes are over 500° to a known soak time and provides an indication to the operator of the vehicle that brake fade is significant when the time provided to the time comparitor that the brakes are over 500° is longer than the soak time.

The fourteenth step 100 is to determine whether the difference in temperature between brakes on the vehicle's left side and brakes on the vehicle's right side is significant enough to indicate that the brakes are out of adjustment. In the exemplary embodiment, when the brake temperature comparitor 62 indicates that the difference in temperature between the brakes on either side of the vehicle is greater than a limit of 20% differentials between brakes or axles for either temperature and thickness, the indicator 72 provides an indication that the brakes are out of adjustment to the operator of the vehicle. The limit is a default value that can be modified by the vehicle builder for special applications.

Referring to FIG. 2C, the fifteenth step 102 is to determine whether there is imbalance between the brakes of separate axles. Brake imbalance between axles occurs when the temperature of the brakes of one axle is significantly different than the temperature of the brakes from a second axle. This difference in temperature indicates that one axle may be performing a disproportionate amount of work. In the exemplary embodiment, when the brake temperature comparitor 62 provides a signal to the indicator that the difference between the temperature of the brakes on one axle as compared to the brakes of a second axle are greater than the limit of a 20% differential. The limit is a default value that can be modified by the vehicle builder for special applications. The indicator 72 provides an indication to the operator of the vehicle of brake imbalance between axles.

The sixteenth step 104a, 104b performed by the diagnostic system 10 uses the measured thicknesses of the remaining brake linings of each brake to indicate that brake imbalance between axles exists or that the brakes on one axle are not properly adjusted. If the brakes of two separate axles were relined at the same time, a significant difference in the remaining brake thickness between the brakes of the two axles indicates that there is brake imbalance between the axles or that the brakes on one axle are not properly adjusted. In the exemplary embodiment, when the position comparitor 58 determines that the difference of the thicknesses of the brakes on one axle as compared to the brakes on another axle are greater than the limit of a 20% differential and the brakes of the two axles were relined at the same time, the indicator 72 provides an indication to the operator of the vehicle of brake imbalance between axles or brakes on one axle are not properly adjusted. The limit is a default value that can be modified by the vehicle builder for special applications.

Referring to FIG. 2C, the seventeenth step 106 performed by the diagnostic system 10, is measuring the temperature of the tires 12 with the tire temperature sensor 68. In the embodiment shown in FIG. 7, one tire temperature sensor 68 is an optical sensor mounted to the vehicle frame 65 that focuses on the tires side wall. An optical temperature sensor that can be used is model no. OS101, manufactured by Omega. In a second embodiment, a thermocouple is molded into the tire as shown in FIG. 7B. In a third embodiment, the temperature of the tires 77 is estimated by extrapolating the measured temperature of the brakes. Extrapolation of the temperature from the brakes to the tire requires testing to establish a relationship for the particular brakes and tires employed. It should be readily apparent to those skilled in the art that a variety of temperature sensors could be used to monitor the temperature of the tires. In the exemplary embodiment, a tire temperature sensor 68 is mounted to each wheel of the vehicle (FIG. 5).

The eighteenth step 108 performed by the diagnostic system 10 is determining whether there is a risk of tire ply separation. As the tires 77 become hot, the air pressure inside the tires increases and the rubber the tires are made from softens. When the temperature of the tires is greater than 266° Fahrenheit for longer than soak time of several minutes while the vehicle is moving tire ply separation becomes a potential problem. The tire temperature comparitor 70 compares the tire temperature sensed by the tire temperature sensor 68 and provides a signal to the timer 64 when the tire temperature is over 266°. The 266° limit is approximate and applies to current tire technology. This limit may vary by tire manufacturer and will increase as tire technology improves. The default limit is 266°, but may be changed by the vehicle designer to correspond to the characteristics of the tire. The timer 64 provides a measure of time to the time comparitor 66 that the tire temperature exceeds 266°. When the time provided to the timer comparitor 66 by the timer 64 is greater than the soak time, the indicator provides a warning to the operator of the vehicle that tire ply separation is possible.

Referring to FIG. 6, the position comparitor 58, the brake temperature comparitor, the tire temperature comparitor 68, as well as the timer 64 and timer comparitor 66 are included in a system controller unit 120. The system controller unit communicates with the position sensor 56, the brake temperature sensor 60 and the tire temperature sensor 68. The system controller unit is also in communication with the indicator, causing the indicator to provide the vehicle operator with the appropriate information about the vehicle.

After performing all the steps of the method, the diagnostic system 10 returns to the first step and repeats the method.

Although the present invention has been described with a degree of particularity, it is the intent that the invention include all modifications and alterations falling within the spirit and scope of the appended claims.

I claim:

1. A method of alerting a vehicle operator of an undesirable wheel component condition, comprising:

a) measuring a temperature of a wheel component;

b) comparing the temperature of the wheel component with a known threshold temperature;

c) measuring a time period that the wheel component temperature exceeds the known threshold temperature;

d) comparing the measured time period with a known soak time; and, e) providing a signal to an operator of the vehicle indicating an undesirable condition when the temperature of the wheel component has exceeded the known threshold temperature for longer than the known soak time.

2. The method of claim 1 wherein said wheel component is a brake component and said signal is intended to alert such operator that brake fade is possible.

3. The method of claim 1 wherein said wheel component is a brake component and said signal is intended to alert such operator of brake fade.

4. The method of claim 1 wherein said signal is intended to alert such operator that tire ply separation is possible.

5. The method of claim 1 wherein said threshold temperature is 300 degrees Fahrenheit and the signal alerts such operator that brake fade is possible.

6. The method of claim 1 wherein said wheel component is a brake component and said threshold temperature is 500 degrees Fahrenheit and the signal alerts such operator of brake fade.

7. The method of claim 1 wherein said wheel component is a brake component and an estimated tire temperature is extrapolated from the measured brake temperature and said signal indicates that tire ply separation is possible.

8. The method of claim 1 wherein said wheel component is a tire and said signal indicates that tire ply separation is possible.

9. An apparatus for indicating a condition of a vehicle wheel assembly comprising:

a) a sensor coupled to said assembly for measuring a temperature of a wheel assembly component;

b) a first comparator for comparing a measured temperature of the component to a known threshold temperature;

c) a timer for measuring a time period the measured temperature exceeds said known threshold temperature;

d) a second comparator for comparing the measured time period to a known soak time; and e) an indicator in communication with said first and second comparators for indicating wheel assembly conditions determined by comparing the measured temperature and measured time to the known threshold temperature and soak time.

10. The apparatus of claim 9 wherein said wheel assembly component is a brake component and said indicator indicates that brake fade is possible when the measured temperature exceeds 300 degrees Fahrenheit for longer than the known soak time.

11. The apparatus of claim 9 wherein said wheel assembly component is a brake component and said indicator indicates brake fade when the measured brake temperature exceeds 500 degrees Fahrenheit for longer than the known soak time.

12. The apparatus of claim 9 wherein said wheel assembly component is a tire and said indicator indicates that tire ply separation is possible.

* * * * *